United States Patent
Zhang et al.

(10) Patent No.: US 11,924,792 B2
(45) Date of Patent: Mar. 5, 2024

(54) TIMING ADVANCE DETERMINATION IN WIRELESS NETWORKS

(71) Applicant: ZTE Corporation, Guangdong (CN)

(72) Inventors: Junfeng Zhang, Guangdong (CN); Peng Hao, Guangdong (CN)

(73) Assignee: ZTE Corporation, Guangdong (CN)

( * ) Notice: Subject to any disclaimer, the term of this patent is extended or adjusted under 35 U.S.C. 154(b) by 453 days.

(21) Appl. No.: 17/367,235

(22) Filed: Jul. 2, 2021

(65) Prior Publication Data

US 2021/0345280 A1 Nov. 4, 2021

Related U.S. Application Data (63) Continuation of application No. PCT/CN2019/070706, filed on Jan. 7, 2019.

(51) Int. Cl.
*H04W 56/00* (2009.01)
*G01S 19/02* (2010.01)
*H04W 72/1268* (2023.01)
*H04W 74/08* (2009.01)

(52) U.S. Cl.
CPC ... *H04W 56/0045* (2013.01); *H04W 72/1268* (2013.01); *H04W 74/0833* (2013.01); *G01S 19/02* (2013.01)

(58) Field of Classification Search
CPC ......... H04W 56/0045; H04W 72/1268; H04W 74/0833
See application file for complete search history.

(56) References Cited

U.S. PATENT DOCUMENTS

| | | | |
|---|---|---|---|
| 10,813,070 B2 | 10/2020 | Hu et al. | |
| 2013/0100938 A1 | 4/2013 | Kwon et al. | |
| 2013/0242735 A1 | 9/2013 | Koc et al. | |
| 2017/0346534 A1 | 11/2017 | Islam et al. | |
| 2020/0112995 A1* | 4/2020 | Islam | H04W 74/02 |
| 2021/0029658 A1* | 1/2021 | Mahalingam | H04W 56/0045 |

FOREIGN PATENT DOCUMENTS

| | | |
|---|---|---|
| CN | 103701517 A | 4/2014 |
| CN | 106488550 A | 3/2017 |
| CN | 107872417 A | 4/2018 |
| EP | 3522469 A1 | 8/2019 |
| KR | 20130045169 A | 5/2013 |
| WO | 2013096616 A1 | 6/2013 |
| WO | 2017204933 A1 | 11/2017 |

(Continued)

OTHER PUBLICATIONS

Office Action for KR Patent Application No. 10-2021-7024727, dated Jan. 18, 2023, 6 pages with unofficial translation.

(Continued)

*Primary Examiner* — Basil Ma
(74) *Attorney, Agent, or Firm* — Perkins Coie LLP (57) ABSTRACT

Techniques are described to determine timing advance amount. For example, a first device receives, from a second device, a message comprising one or more fields that include information indicative of a communication delay between the first device and the second device. The first device processes the message to use the information for a transmission between the second device and the first device.

20 Claims, 6 Drawing Sheets

(56) References Cited

FOREIGN PATENT DOCUMENTS

WO     2018085428 A1    5/2018

OTHER PUBLICATIONS

Co-Pending EP Application No. 19849514.5, Article 94 Communication dated Oct. 24, 2023, 4 pages.
Office Action for Chinese Patent Application No. 2019800882309, dated May 17, 2023, 12 pages with unofficial translation.
Office Action for Korean Patent Application No. 10-2021-7024727, dated Jul. 18, 2023, 4 pages with unofficial translation.
European Search Report for EP Patent Application No. 19849514.5, dated Dec. 15, 2021, 12 pages.
International Search Report and Written Opinion dated Sep. 30, 2019 for International Application No. PCT/CN2019/070706, filed Jan. 7, 2019 (6 pages).
Ericsson et al. "Timing Advance value initialization" 3GPP TSG-RAN WG2 #78, Tdoc R2-122584, May 25, 2012 (May 25, 2012), 3 pages.
KIPO, Notice of Allowance for Korean Application No. 10-2021-7024727, dated Jan. 3, 2024, 8 pages with English translation.

\* cited by examiner

TIMING ADVANCE DETERMINATION IN WIRELESS NETWORKS

CROSS-REFERENCE TO RELATED APPLICATIONS

This application is a continuation of and claims priority to International Patent Application No. PCT/CN2019/070706, filed on Jan. 7, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for determining a timing advance amount in a wireless communication system. In a first exemplary embodiment, a wireless communication method comprises receiving, by a first device, from a second device, a message comprising one or more fields that include information indicative of a communication delay between the first device and the second device; and processing the message to use the information for a transmission between the second device and the first device.

In some embodiments, the one or more fields includes a time information received via a second message using a physical uplink shared channel (PUSCH) scheduled by a first message, where the first message precedes the second message, or the one or more fields includes a time information received by the first device during a random access procedure, or the one or more fields includes a time information from a traffic channel bearer after completion of the random access procedure. In some embodiments, the first device scrambles control information of the first message using a random-access preamble index and transmits the first message to the second device. In some embodiments, the one or more fields includes a first timing advance amount which based on a location of the first device and the second device.

In some embodiments, the method or system further comprises determining, by the first device, a second timing advance amount based on a reception of a random-access preamble from the second device; and determining, by the first device, a third timing advance amount by combining the first and second timing advance amounts. In some embodiments, the one or more fields includes a time information associated with transmission or reception by the second device at a specific time during a random access procedure. In some embodiments, the one or more fields includes a transmission time information associated with a time when the second device sends a second message using a physical uplink shared channel (PUSCH), or the one or more fields includes a reception time information associated with a time when the second device receives a first message that precedes the second message. In some embodiments, the one or more fields includes one or more parameters to determine a time information associated with transmission or reception by the second device at a specific time during a random access procedure.

In some embodiments, the one or more parameters includes index information at the specific time corresponding to any one or more of a radio frame, a subframe, a time slot, and a symbol. In some embodiments, the time information associated with transmission or reception by the second device is determined by: determining, using the one or more parameters, a transmission time information associated with a time when the second device sends a second message using a physical uplink shared channel (PUSCH), or determining, using the one or more parameters, a reception time information associated with a time when the second device receives a first message that precedes the second message.

In some embodiments, the one or more fields includes a location information of the second device. In some embodiments, the method or system further comprises determining, by the first device, a timing advance amount based on the location information of the second device. In some embodiments, the first device is included in a satellite that orbits earth.

Another exemplary embodiment includes wireless communication method that comprises: transmitting, by a second device, to a first device, a message comprising one or more fields that include information indicative of a communication delay between the second device and the first device.

In some embodiments, the one or more fields includes a time information received via a second message transmitted by the second device using a physical uplink shared channel (PUSCH) scheduled by a first message, where the first message precedes the second message, or the one or more fields includes a time information transmitted by the second device during a random access procedure, or the one or more fields includes a time information from a traffic channel bearer after completion of the random access procedure.

In some embodiments, the one or more fields includes a first timing advance amount which based on a location of the first device and the second device.

In some embodiments, the one or more fields includes a time information associated with transmission or reception by the second device at a specific time during a random access procedure.

In some embodiments, the one or more fields includes a transmission time information associated with a time when the second device sends a second message using a physical uplink shared channel (PUSCH), or the one or more fields includes a reception time information associated with a time when the second device receives a first message that precedes the second message.

In some embodiments, the one or more fields includes one or more parameters to determine a time information associated with transmission or reception by the second device at a specific time during a random access procedure.

In some embodiments, the one or more parameters includes index information at the specific time corresponding to any one or more of a radio frame, a subframe, a time slot, and a symbol.

In some embodiments, the one or more fields includes a location information of the second device.

A third exemplary embodiment discloses a system, comprising a second device and a first device. The second device is configured to: transmit to a first device, a message comprising one or more fields that include information indicative of a communication delay between the second device and the first device. The first device is configured to: receive the message sent by the second device; and process the message to use the information for a transmission between the second device and the first device.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In the traditional terrestrial cellular communication system, an important function to transmit and receive a random access signal and signals associated with a random access procedure is to estimate the two-way propagation delay between a user equipment (UE) and a base station. A UE can send data via an uplink communication to a base station by compensating for the propagation delay so that when the UE sends data to the base station the data arrives at the base station at a time in a synchronized state. By compensating for the propagation delay, the UEs can perform transmissions so that the arrival time relative to the reference time of all users are within the protection range of the cyclic prefix (CP), and so that the Orthogonal Frequency Division Multiple Access (OFDMA) can be maintained for all users. Thus, by at least compensating for propagation delay, the uplink reception of multiple users of the communication system of the Orthogonal Frequency Division Multiple Access (OFDM) technology can be orthogonal and may not interfere with each other.

Figure 1:
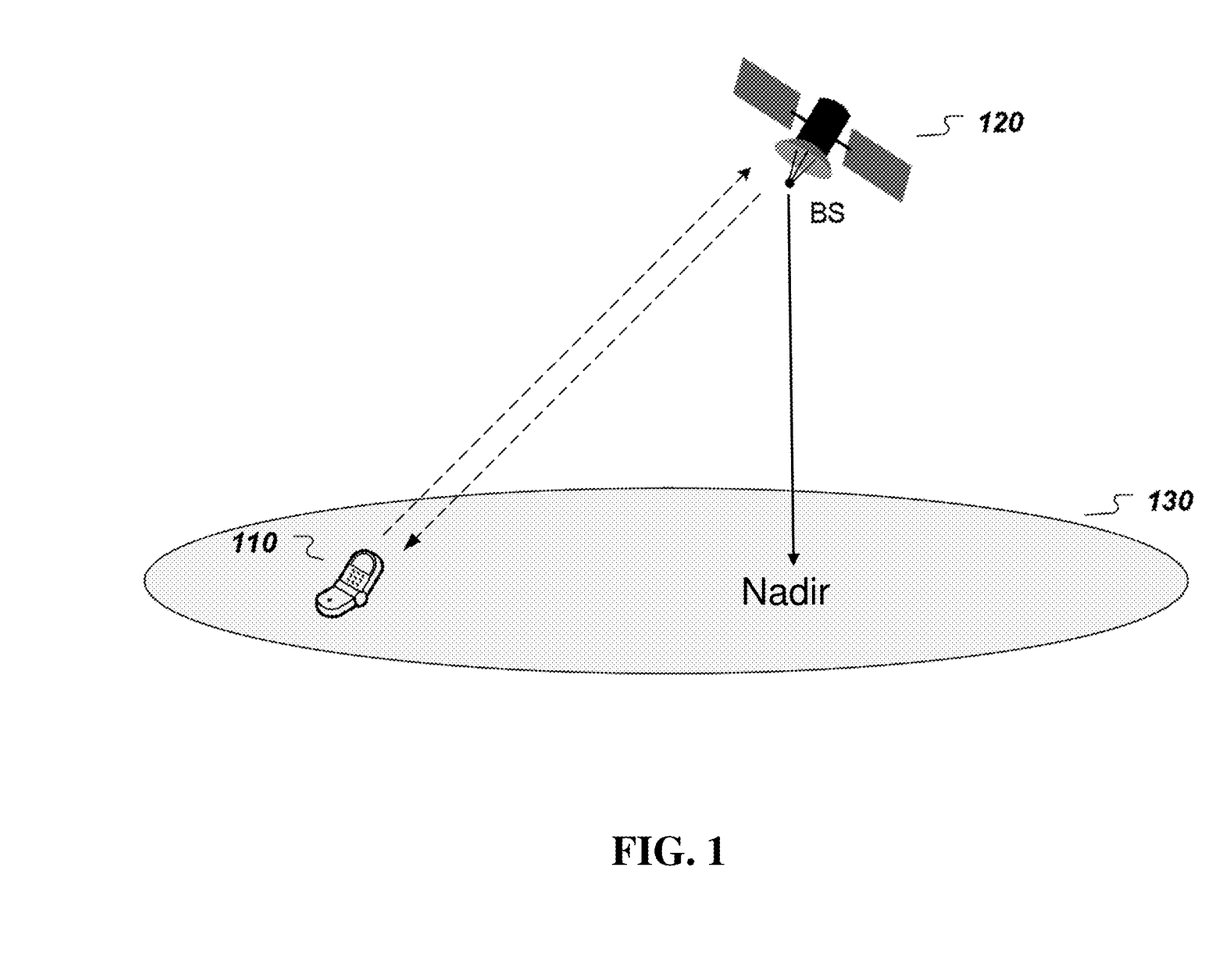
FIG. 1 is shows an ultra-long coverage scenario where a communication node communicates with a satellite-based base station.

Conventional terrestrial cellular mobile communication systems, such as long-term evolution (LTE) or new radio (NR), can support cell coverage distances up to 100 km or 300 km by extending the length of the random access preamble and the length of the random access signal protection time (e.g., by selecting an appropriate CP length) combined with special base station receiving technology. However, as shown in FIG. 1, the typical scenario of a new generation of ground-to-air communication systems can involve geostationary satellites (GEOs) 120 that can include a base station. The satellite 120 may have an elevation of approximately 35,786 km, or the satellite 120 may be a medium-to-earth satellite that orbits at altitudes between approximately 7,000 km and 20,000 km, or the satellite 120 may be low-range-earth satellite that orbits at a height between approximately 600 km and 1500 km. Thus, the linear distance from the satellite to the ground UE 110 has far exceeded the limit of 300 km of ground coverage. The traditional method of increasing the random access preamble and its CP length is greatly limited because the length of the random access preamble sequence is limited by the subcarrier spacing of the random access signal. Furthermore, due to the larger propagation delays, the subcarrier spacing cannot be made very small for use in a wireless network, and the length of the CP cannot exceed the length of the random access preamble sequence, otherwise doing so will bring timing ambiguity.

Currently, there are some conventional techniques to solve the problem of random access in satellite communication. For example, based on a UE's position information and a satellite base station ephemeris operation rule, the UE can determine the distance between the UE and the satellite and can calculate the possible approximate range of timing advance (TA) amount to determine when to initiate uplink transmission. Thus, a random-access signal is sent in advance according to the TA amount, and then the TA amount is fine-tuned using fine-tuned TA amount, e.g., by a regular random access process. The fine-tuned TA amount, also known as $TA_{fine}$, can be estimated by base station through normal random access preamble. However, this scheme has two problems. A first problem involves the second step of the random access process where the random access radio network temporary identifier (RA-RNTI) is verified. If the UE's estimate of the approximate range of TA amount is not accurate, considering the fast-moving orbiting satellite, the UE estimated TA amount may be greater than the length of random access occasion or the length of the symbol. Thus, the UE may fail to verify the correct RA-RNTI when the second step is received, resulting in random access failure. Second, after completing the random access process, the base station does not know the location information of the UE except that the base station knows a fine-tuned TA amount (i.e., $TA_{fine}$) and a TA amount calculated according to the one-way path distance from the nadir point to the satellite (shown in FIG. 1) and both of these TA amounts, separately or in combination, may not be the actual TA amount. Thus, the actual TA amount cannot be measured and cannot be used to determine the timing-related processing parameters of the subsequent traffic channel, such as HARQ.

Still other conventional schemes broadcast a reference TA amount to the UE in advance from the satellite base station. For example, the TA amount can be determined by the base station by using a distance between the lowest nadir point of the vertical line between the earth and the satellite, and the base station can broadcast the determined TA amount to the UE. The UE transmits the random access signal in advance by using the TA amount determined by the base station. The residual TA amount without pre-compensation is then determined by a conventional random access process. The residual TA amount may be larger than the CP length and the residual TA amount may not be estimated by the receiving of random access preamble. However, such a scheme may have feasibility problems at least in the case of a synchronized satellite orbit GEO scenario or a high-orbit satellite scenario. If the path difference calculated by nadir and edge of coverage (EOC) (130 in FIG. 1) is very large, then the transmission time caused by the path difference is longer than the CP length. For example, in the GEO scenario, if the path difference calculated by the one-way nadir and EOC reaches 4800 km, then the time of the light speed signal passing through 4800 km is 16 ms. That is to say, the residual two-way TA amount without pre-compensation needs to be 32 ms. However, the CP length of the random access signal is too small to be measured, and the residual uncompensated TA amount from the EOC point cannot be measured by the random access signal.

The technology described in this patent document can solve the technical problems described above, among others. In an exemplary embodiment, the disclosed technology provides a technique for determining a TA amount of a base station under a ultra-long coverage scenario, such as the UE to satellite base station communications as shown in FIG. 1. The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

In current air-ground integrated communication system, a terrestrial user (e.g., a UE on the earth) can communicate with one or more satellites. In order to control the implementation complexity of such a UE, it is useful to reduce any special circuitry needed by the UE simply to support the satellite communication scenario. Therefore, satellite communication related technical systems, such as multiple access, frame structure, synchronous access and other important aspects should be considered as compatible with terrestrial UEs. For example, random access aspects including random access preamble and random access process can be modified to the special scenario of satellite communication. The current communication framework for random access may be modified for satellite communication scenario, but it involves frame structure, multiple access mode, downlink synchronization signal, etc. and modification of random access signal framework may not be the best option because it may break backward compatibility or other aspects of the conventional terrestrial wireless communication scenario.

I. Techniques to Determine a Complete TA Amount of the Base Station

In some embodiments, before the UE and the base station perform a four-step random access. The UE first determines the base station that is to be accessed based on measurement or auxiliary information indication, such as the UE's position information (such as ground station positioning or global positioning system (GPS) position) or satellite base station operating rules (ephemeris, star map, etc.) to roughly determine the distance d between the UE and the satellite base station. Based on the determined distance d, the UE can calculate the approximate range of timing advance $TA_{rough}=2*C/d$, where C is the speed of light.

Figure 7:
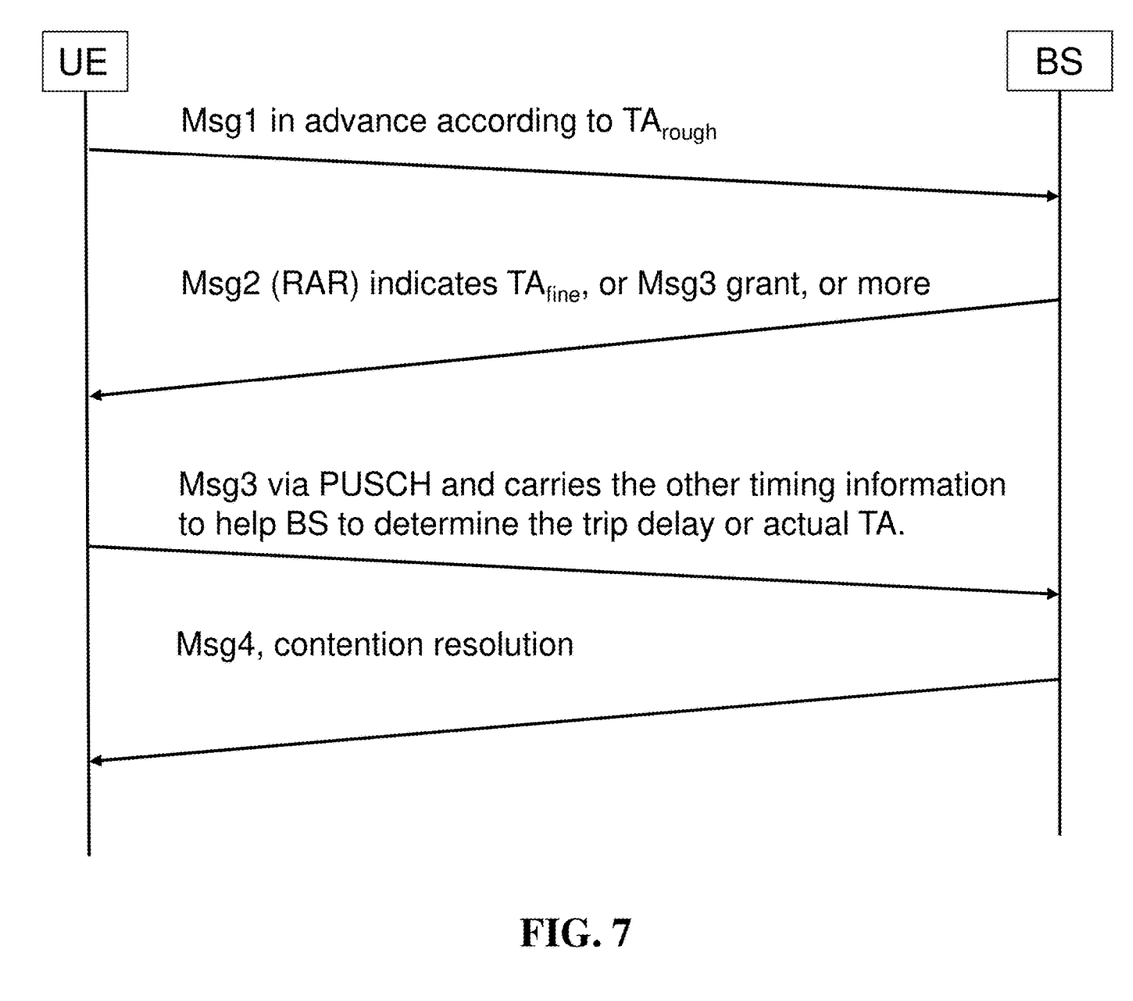
FIG. 7 shows another exemplary flowchart for a network node processing information to determine a timing advance amount.

As shown in FIG. 7, the UE sends a preamble via a random access signal in a first message Msg1 in advance according to $TA_{rough}$. The base station measures the random access preamble and determines another timing advance $TA_{fine}$ that can be fine-tuned, and sends an authorization command (e.g., grant) carried by a second message Msg2 to the UE for fine adjustment. Msg2 can include $TA_{fine}$ that can be the residual time advance amount of $TA_{rough}$ and can be determined by the base station using random access preamble received in Msg1. As shown in FIG. 7, Msg2 random access response (RAR) may be transmitted using physical downlink control channel (PDCCH) and PDSCH. At this time, while the base station may not know the $TA_{rough}$ information (i.e., the estimated one-way propagation delay) measured or calculated by the UE, the base station needs to know the estimated $TA_{rough}$ of the UE to determine processing parameters (e.g., related to scheduling timing, HARQ, etc.,) of the traffic channel. Thus, the UE may transmit a third message Msg3 using a physical uplink shared channel (PUSCH) scheduled by Msg2, where the Msg3 can include $TA_{rough}$. As shown in FIG. 7, the UE may transmit Msg3 in advance according to $TA_{fine}$ received in Msg2. When the base station receives Msg3 and extracts $TA_{rough}$, this parameter can be combined with $TA_{fine}$ to obtain a complete or actual TA. In some embodiments, the base station may optionally transmit a fourth message Msg4 that includes the actual TA transmitted to the UE.

In some embodiments, a satellite may orbit at different heights so that $TA_{rough}$ can have a relatively large dynamic range of values, which is not conducive to the UE transmitting Msg3 in a fixed size as far as possible. Therefore, the UE may carry a specific time in Msg3 where the specific time relates to certain transmission time information or reception time information, or the UE may carry one or more parameters in Msg3 where the one or more parameters can be used by the base station to determine certain transmission or reception time information at a specific time. In some embodiments, the UE may use the one or more parameters to scramble Msg3. The specific time included in Msg3 can be a time when the UE sends the Msg3, or a time when the UE receives the Msg2. The one or more parameters used to assist in determining time information for a specific time can be any one or more of uplink or downlink wireless frames, sub-frames, time slots, symbols, and other time index information at a specific time, by using the following example equation: $(1+s\_id+14*t\_id+14*X*f\_id+14*X*Y*ul\_carrier\_id)$, where s_id represents the symbol index, t_id represents the time slot index, f_id represents the frequency index, ul_carrier_id represents the uplink carrier information, X is the number of time slots in the wireless frame, and Y is the maximum number of frequency multiplexing. If a downlink index parameter is chosen by the UE, then the system can determine the wireless frame offset between the downlink and uplink. In a conventional wireless system, the frame or subframe offset between the downlink and uplink may be predefined or pre-indicated by the UE to the base station. Thus, in a conventional wireless system, if the timing parameter is aggregated by uplink index, the base station can translate these parameters to a downlink parameter. But, if the UE may not pre-determine the offset or indicate the offset to the base station, then the downlink index (using the above example) can be used by the base station because the TA estimation is based on the base station clock.

In some embodiments, the base station can determine a timing advance amount based on the transmission time information (e.g., of Msg3) or reception time information (e.g., Msg2) that is received from the UE or that is determined by the base station based on the one or more parameters sent by the UE. For example, a base station may subtract the time when Msg2 is transmitted by the base station from the time when Msg2 is received at the UE to obtain a one-way downlink propagation delay. In another example, the base station may subtract the time when Msg3 is transmitted by the UE from the time when Msg3 is received by the base station to obtain a one-way uplink propagation delay. Based on these exemplary calculations, the base station can send the determined timing advance amount to the UE using, for example, in Msg4.

In some embodiments, the UE may transmit its geographic location information in the Msg3. The base station can obtain the UE's geographic location information via Msg3 and the base station can calculate a length of the propagation path between the base station and the UE, thereby obtaining a propagation delay or a timing advance amount.

In some embodiments, after the base station receives the Msg3 and extracts the time information of the UE at a specific time or extracts the one or more parameters used to assist in determining the time information of the specific time, the base station determines the time information when Msg3 is received by the base station, where the difference between the specific time information carried by or obtained from Msg3 and the reception time of Msg3 is the uplink one-way propagation delay. In some embodiments, the base station may obtain the one-way propagation delay based a difference between a time information obtained from Msg3 with a time when the base station sends the Msg2, where the difference between the time when Msg2 received in UE and the transmission time of Msg2 in base station is the downlink one-way propagation delay. Thus, the bidirectional propagation delay can be determined as a sum of the uplink and downlink propagation delay. If the minimum unit of the time index information is a symbol, the determined bidirectional propagation delay can have an accuracy of ±0.5 symbols, and the bidirectional propagation delay accuracy can be sufficient for the service timing or timing design.

In some embodiments, the time information of the $TA_{rough}$, the specific time of transmission or reception of a message by the UE, the one or more parameters used to assist in determining a specific time information, or the geographical location information of the UE, or other information may be transmitted by the UE in the PUSCH to the BS after the four steps of the random access, and the radio resource control (RRC) link is successfully established.

II. Random Access Process not Sent in Advance for Random Access

In some embodiments, UE does not need to use the UE's positioning information, satellite base station operation rule or broadcast system information to calculate can estimate of the TA amount (e.g., $TA_{rough}$) to send random access preamble in advance based on the estimated TA amount. As an example, taking the four-step random access process shown in FIG. 3, the UE may not consider the UE's positioning information, satellite base station operation rule or broadcast system information which may include the calculated timing advance amount and other prior information.

Figure 2:
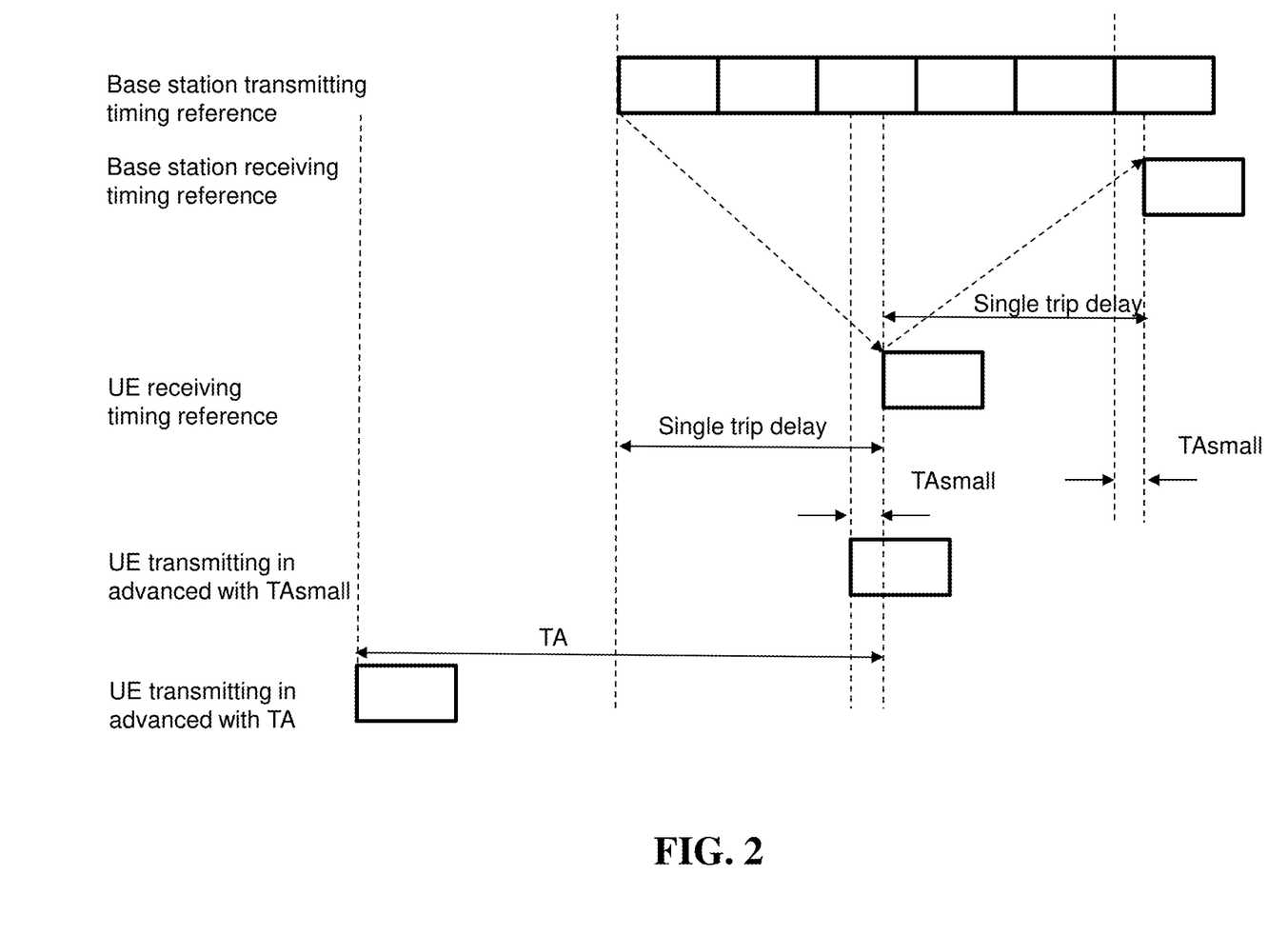
FIG. 2 shows an embodiment of a two-level timing advance measurement scheme.

Without losing generality, the actual TA amount involved in the whole random access process can be divided into at least two levels. FIG. 2 shows a two-level timing advance measurement scheme. As shown in FIG. 2, the first level is a small scale timing advance $TA_{small}$ determined by the difference between the boundary of uplink subframe or slot received by the base station and the uplink arrival time of the random access preamble sent by the UE. The $TA_{small}$ can make the uplink arrival time of the PUSCH to be aligned at the uplink receiving boundary of subframe or slot in base station, which the boundary is assumed to be the front edge, as shown in FIG. 2. $TA_{small}$ may be shorter than the length of the sub-frame. For PUSCH with time slot or sub-frame as the basic demodulation unit, the alignment of arrival PUSCH with the uplink time slot or sub-frame edge is sufficient to ensure that the base station can demodulate the subsequent PUSCH by blind decoding, such as Msg3 PUSCH, it is no need to completely make up for all the timing advance TA, whether TA obtains or does not affect the demodulation of PUSCH in the initial access phase. Furthermore, the smaller timing advance volume $TA_{small}$, only need to ensure the alignment of the arrival timing of the PUSCH after adjustment with the edge of any uplink receiving time slot or sub-frame in base station, and not limited to the preamble actual arrival of the uplink receiving time slot/sub-frame. Here time slot or sub-frame edge alignment can imply and can provide the alignment of the edges of the internal symbol.

The second level for the actual TA is a complete consideration of the real two-way propagation delay under the time adjustment, including the first level for the smaller timing advance volume $TA_{small}$. The TA in FIG. 2 can be equal to double the one-way propagation delay (e.g., double the single trip delay). In some embodiments, TA may not need to ensure that uplink reception needs to be aligned with the edges of a time slot/sub-frame/wireless frame, etc., Such grading is based on the two-level structure of the frame structure suitable for service transmission of the conventional communication system, which is divided into a radio frame and a sub-frame/slot, and the sub-frame/slot is the smallest service transmission unit. If the frame structure of the future technology has more hierarchical structures, such as the service transmission unit is subtler to the symbol level, then at least one grading is required to ensure that the timing advance can make alignment of the uplink arrival time of the PUSCH with the symbol boundary which the random access preamble actually reach. Or the frame structure definition includes a structural unit longer than the current 10 ms radio frame, such as a super frame of 100 ms or one second, and the random access preamble and the service transmission unit are likely to extend the length to a length of about 10 ms. In the case of a level, then at least one level may be required to ensure that the timing advance can be such that the uplink arrival time of the PUSCH is aligned with the edge of the uplink radio frame which may include the random access preamble. For the air-ground integrated communication system, since the path loss is very large, in order to compensate for the shortage of the link budget, it is necessary to lengthen the service processing unit, and such a frame structure is likely to occur.

Figure 3:
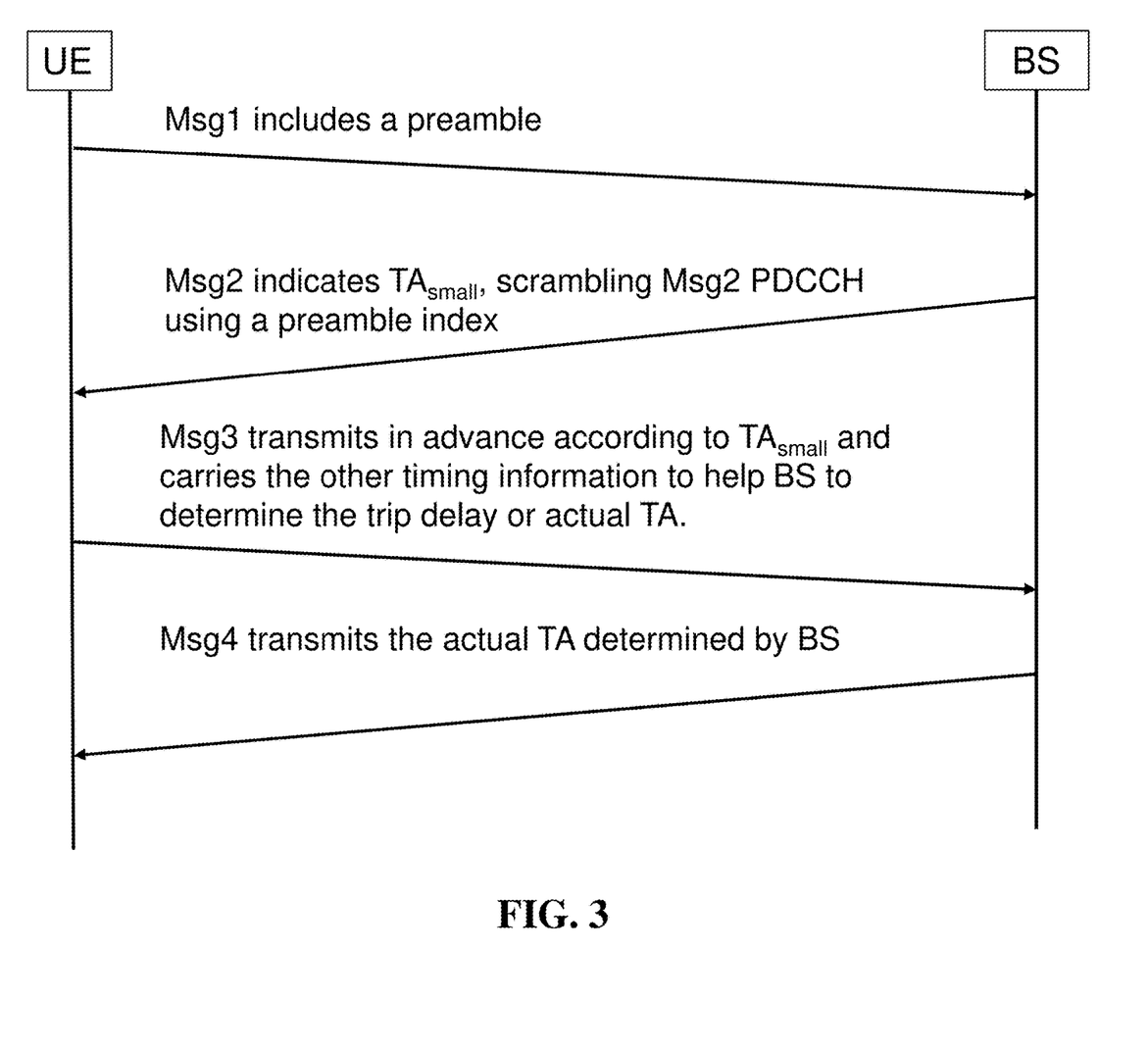
FIG. 3 shows an exemplary flowchart for a network node processing information to determine a timing advance amount.

The following is a further detailed description of the random access process under ultra-long coverage, as described in FIG. 3. The UE transmits a random access signal/preamble in the first step. After receiving the random access preamble and correctly detecting the timing according to the slot/subframe edge referenced by the base station, the base station generates a timing adjustment command TA$_{small}$, that is, a smaller timing advance, which can align the slot/subframe edge. The TA$_{small}$ is delivered to the UE in the grant information of the Msg2, and the time slot/subframe edge alignment is ensured when the Msg3 PUSCH sent by the UE with TA$_{small}$ in advance. Due to the very large propagation delay in the link, and the propagation delay is unknown to both the base station and the UE, the time or frequency information of the Mgs1 received by the base station is not known to the UE, and the UE cannot identify the Msg2 PDCCH scrambled by the RA-RNTI which generated by the base station using Msg1 receiving time or frequency. As a result, the Msg2 PDCCH scrambled with the RA-RNTI is infeasible. Alternatively, the base station may scramble the control information (e.g., PDCCH) of the Msg2 according to the index of the received random access preamble of the Mgs1, or use another predefined sequence to scramble the control information of the Msg2. If it is non-contention random access, C-RNTI can also be used for scrambling. If it is a two-step random access based on contention, the content of the Mgs1 additional information such as the UE ID may be used to scramble the PDCCH of the Msg2. The method of scrambling the PDCCH by using the random access preamble index may increase the collision probability of Msg2 in the random access process, but the collision probability may be reduced by enhancing the random access preamble sequence capacity. The UE further demodulates the PDSCH indicated by the PDCCH, that is, the information content of the Msg2 by descrambling the PDCCH that may use the above scrambling mode, and the information content in PDSCH includes at least TA$_{small}$.

After receiving the Msg2, the UE can send the Msg3 PUSCH according to the time-frequency domain resource determined in the Msg2 grant or scheduling information content, and perform timing advance according to TA$_{small}$. In order for the base station to completely determine the actual TA amount, the UE may use the Msg3 transmission to assist the base station in determining the timing information of the TA.

For example, the UE may transmit certain time information about a specific time when the UE sends the Msg3, or the UE may transmit one or more parameters used to assist in determining the time information when Msg3 is sent by the UE. The parameters related to the time information can also be used to scramble the Msg3. For example, UE can select any one or more combinations of uplink wireless frames, sub-frames, time slots, symbols and other time index information at the uplink sending moment as a parameter to determine the time information when Msg3 is sent by UE. The UE can also choose the uplink transmission time corresponding to the downlink wireless frame, sub-frame, time slot, symbol and other time index information of any combination as a parameter to assist in determining the time information when Msg3 is sent by UE, the latter set of parameter combinations can work under the condition that the system may not define the downlink wireless frame offset with uplink frame.

In another example, the time information sent by the UE in Msg3 may be a time when the UE receives the Msg2 or one or more parameters used to assist in determining the time information of the Msg2 reception time. The time information related parameters may also be used to scramble the Msg3. The UE may select any combination of downlink radio frames, subframes, time slots, symbols and other time index information corresponding to the downlink receiving time as parameters for assisting in determining the receiving time information. The UE may also select any combination of uplink radio frames, subframes, time slots, symbols, and other time index information corresponding to the downlink reception time as parameters for assisting in determining the reception time information of Msg2.

In some embodiments, the UE may transmit its geographic location information to the base station, which can be used by the base station to calculate the propagation path length between the base station and the UE, and then obtain the propagation delay.

If the Msg3 PUSCH capacity is not sufficient to carry the time information mentioned above, the time information may be transmitted to the base station through other PUSCH message(s) after the random access procedure is completed.

If the time information mentioned earlier to assist the base station to determine the timing advance amount is based on the sending moment or sending time of Msg3, the base station receives and correctly demodulates Msg3 at the possible time-frequency domain resource location, and obtains the time information of the UE sending moment of the Msg3 or the parameters used to assist in determining the time information of the sending moment. Combined with the base station to receive Msg3 time information, the difference between the two (the base station received Msg3 time information-UE send Msg3 time information) is the uplink one-way propagation delay, that is, 0.5*TA, can be calculated and determined by the base station.

If the time information used to assist the base station to determine the timing advance is based on the reception time of the Msg2 in UE, the base station receives and correctly demodulates the Msg3 at the possible time-frequency domain resource location, and acquires time information of the time when the UE receives the Msg2 or the parameter for determining the time information of the receiving time, combined with the time information of the Msg2 transmitting time, base station can derive that the difference between the two (the time information of the time when the UE receives the Msg2 time–the time information of the time when the base station sends the Msg2) is the one-way propagation of the downlink. The delay, which is (0.5*actual TA), can be calculated and determined by the base station.

Thus, the bidirectional propagation delay TA can be further determined. If the time information is used to assist in determining the parameters of the time information related to the Msg2 received moment or received time, the parameter granularity is limited to the symbol or time slot, the accuracy of the TA can only reach the ±0.5 symbol or time slot.

This two-way propagation delay can optionally be transmitted by the base station to the UE through Msg4. Msg4 is used to resolve the UE collision. Thus, the two-way propagation delay information can be used by the subsequent PUSCH by the UE to adjust the timing advance. The base station can also further determine the parameters related to subsequent service timing or timing design according to the two-way propagation delay determined.

III. Two-Step Random Access Process Scheme Under Ultra-Long Coverage Scenario

The exemplary techniques described in Sections 1 and II use a four-step random access procedure. In Sections I and II, at least when the base station receives the random access preamble in the first step and sends the response in the second step, the base station may still not know the large scale propagation delay information such as TA$_{rough}$ information. The base station can determine the Msg3 PUSCH receiving time domain resources according to the minimum and maximum possible propagation delay. The uncertain propagation delay may cause the window which base station waits to receive Msg3 after transmitting Msg2 to be very long, where the one-way path difference between nadir and EOC can reach 16 ms, meaning that the waiting window may need to be set to 32 ms. Compared to the limited time-domain resource length of the Msg3 itself, this empty window period is very long. In principle, the PUSCH of other users is not allowed to be scheduled in the waiting window for this Msg3, which directly reduces the efficiency of the uplink resources. If the UE transmits the random access preamble sent in the first step with certain additional information, such as the large scale propagation delay information or the parameters used to assist in the calculation of propagation delay information, then the efficient receiving window of Msg3 can be set by the base station according to the actual propagation delay, which can greatly improve the efficiency of uplink resources. From this point of view, the two-step random access process scheme can improve the efficiency of satellite base station more effectively. Therefore, the embodiments in Sections I and II can use the two-step random access process, where Msg1 in the first step contains the transmission of additional information in addition to the random access preamble, and where additional information can include any one or combination of the following: $TA_{rough}$, the time information of the time when the UE sends the Msg1 or one or more parameters used to assist the base station in determining the time information of the time when Msg1 is sent by the UE.

The following description summarizes some of the features described in this patent document.

This patent document describes techniques that, in one example aspect, may be used by embodiments to indicate delay information. The delay information can be the round trip delay caused by the signal transmitting between the base station and UE. In large-scale coverage, such as in satellite communication, the delay should be considered in the system design. As the delay can be very long, satellite can only know the round trip delay between the satellite and nadir point. However, for geostationary satellite, the EOC may be very far which can cause the difference in the delay between the EOC to satellite and nadir to satellite to be large. Thus, the GEO satellite cannot do TA estimation as the PRACH format is not so long compared with the difference in the delay. In some embodiments, the UE can send the actual delay information or other information can help the base station on the satellite to determine the actual or total TA. The UE can send the delay information or other information, for example, in the Msg3 PUSCH or PUSCH after the initial access, to aid in the process of the TA estimation and determination in the uplink information. If the random access channel (RACH) procedure is a two-step RACH procedure, the delay or other information can also be convey in the Mgs1 addition information.

The exemplary details of the delay information can include as below:

The UE may determine a delay according to the location of UE and satellite, where the satellite location can be obtained from the satellite orbit information in advance, and the UE location information can be obtained from GPS. The base station can derive the delay combined with the location of the UE.

The other information can include: the timing information which UE can send via the Msg3, the timing of sending Msg3 can help base station to derive the single uplink trip delay through the receiving time of Msg3 in base station minus the sending time of Msg3 in UE, the timing of getting Msg2 can also help base station to derive the single downlink trip delay through the getting time of Msg2 in UE minus the sending time of Msg2 in base station. The other information can be the exact timing or the substitute timing which is the combination of the frame, subframe, slot, symbol index in downlink or uplink.

Figure 4:
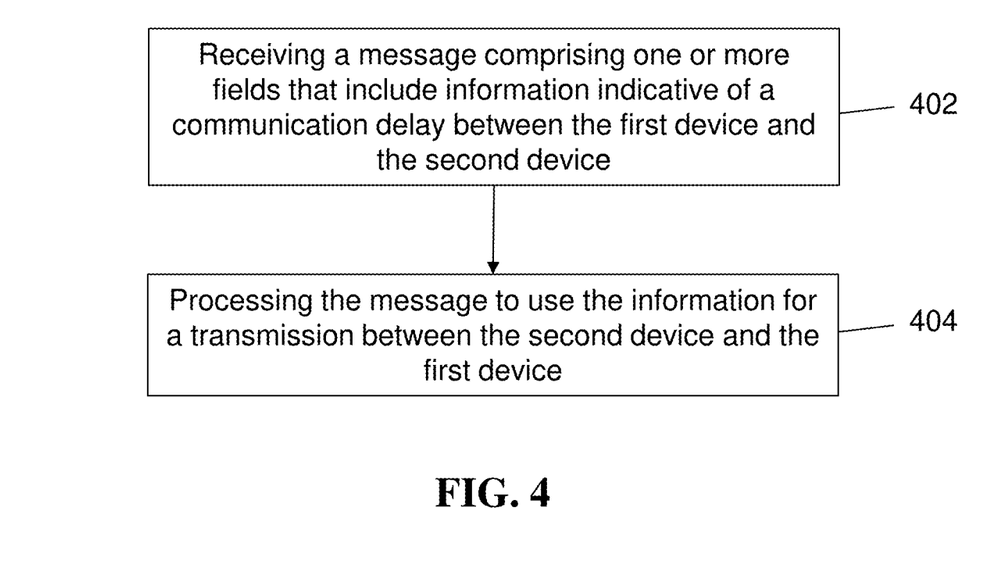
FIG. 4 shows an exemplary flowchart for a network node processing information to determine a timing advance amount.

FIG. 4 shows an exemplary flowchart for a network node processing information to determine a timing advance amount. At the receiving operation 402, a first device, such as a network node, receives from a second device, such as a terminal, a message comprising one or more fields that include information indicative of a communication delay between the network node and the terminal. At the processing operation 404, the network node processes the message to use the information for a transmission between the terminal and the network node.

In some embodiments, the one or more fields includes a time information received via a second message using a physical uplink shared channel (PUSCH) scheduled by a first message, where the first message precedes the second message, or the one or more fields includes a time information received by the network node during a random access procedure, or the one or more fields includes a time information from a traffic channel bearer after completion of the random access procedure. In some embodiments, the network node scrambles control information of the first message using a random-access preamble index and transmits the first message to the terminal. In some embodiments, the one or more fields includes a first timing advance amount which based on a location of the network node and the terminal.

In some embodiments, the method or system further comprises determining, by the network node, a second timing advance amount based on a reception of a random-access preamble from the terminal; and determining, by the network node, a third timing advance amount by combining the first and second timing advance amounts. In some embodiments, the one or more fields includes a time information associated with transmission or reception by the terminal at a specific time during a random access procedure. In some embodiments, the one or more fields includes a transmission time information associated with a time when the terminal sends a second message using a physical uplink shared channel (PUSCH), or the one or more fields includes a reception time information associated with a time when the terminal receives a first message that precedes the second message. In some embodiments, the one or more fields includes one or more parameters to determine a time information associated with transmission or reception by the terminal at a specific time during a random access procedure.

In some embodiments, the one or more parameters includes index information at the specific time corresponding to any one or more of a radio frame, a subframe, a time slot, and a symbol. In some embodiments, the time information associated with transmission or reception by the terminal is determined by: determining, using the one or more parameters, a transmission time information associated with a time when the terminal sends a second message using a physical uplink shared channel (PUSCH), or determining, using the one or more parameters, a reception time information associated with a time when the terminal receives a first message that precedes the second message.

In some embodiments, the one or more fields includes a location information of the terminal. In some embodiments, the method or system further comprises determining, by the network node, a timing advance amount based on the location information of the terminal. In some embodiments, the network node is included in a satellite that orbits earth.

Figure 5:
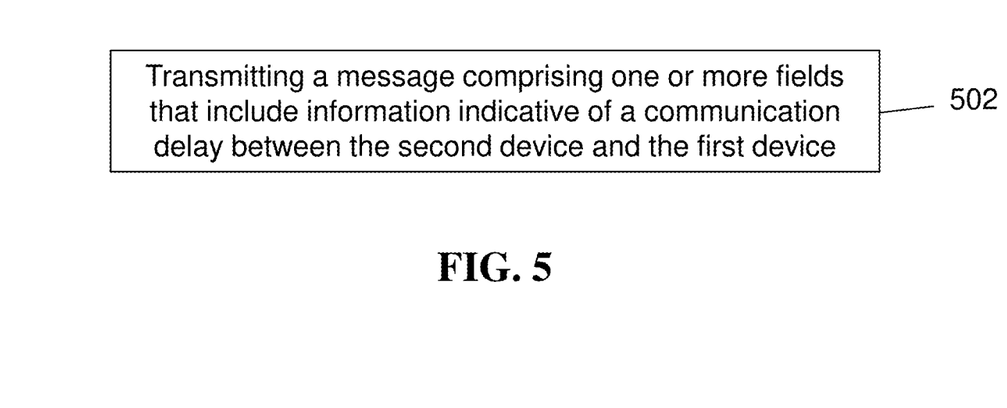
FIG. 5 shows an exemplary flowchart for a communication node transmitting information to a network node that determines a timing advance amount.

FIG. 5 shows an exemplary flowchart for a communication node transmitting information to a network node that determines a timing advance amount. At the transmitting operation 502, a second device, such as a terminal, transmits to a first device, such as a network node, a message comprising one or more fields that include information indicative of a communication delay between the terminal and the network node. In some embodiments, the one or more fields includes a time information received via a second message transmitted by the terminal using a physical uplink shared channel (PUSCH) scheduled by a first message, where the first message precedes the second message, or the one or more fields includes a time information transmitted by the terminal during a random access procedure, or the one or more fields includes a time information from a traffic channel bearer after completion of the random access procedure.

In some embodiments, the one or more fields includes a first timing advance amount which based on a location of the network node and the terminal. In some embodiments, the one or more fields includes a time information associated with transmission or reception by the terminal at a specific time during a random access procedure. In some embodiments, the one or more fields includes a transmission time information associated with a time when the terminal sends a second message using a physical uplink shared channel (PUSCH), or the one or more fields includes a reception time information associated with a time when the terminal receives a first message that precedes the second message.

In some embodiments, the one or more fields includes one or more parameters to determine a time information associated with transmission or reception by the terminal at a specific time during a random access procedure. In some embodiments, the one or more parameters includes index information at the specific time corresponding to any one or more of a radio frame, a subframe, a time slot, and a symbol. In some embodiments, the one or more fields includes a location information of the terminal.

An exemplary embodiment includes a system that comprises a terminal and a network node. The terminal is configured to: transmit to a network node, a message comprising one or more fields that include information indicative of a communication delay between the terminal and the network node. The network node is configured to: receive the message sent by the terminal; and process the message to use the information for a transmission between the terminal and the network node. The network node and terminal can be configured to perform the operations described in FIGS. 4 and 5 and in the various embodiments described in this patent document.

Figure 6:
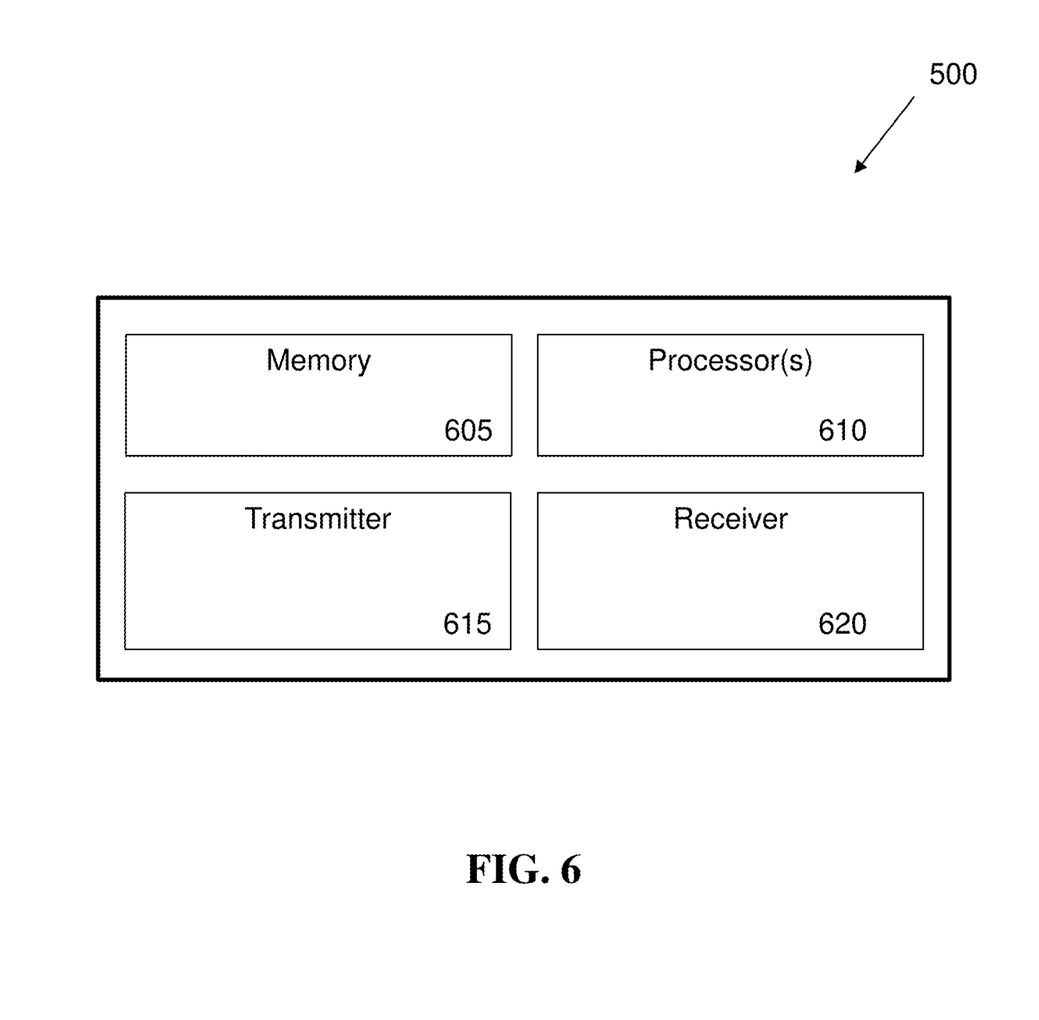
FIG. 6 shows an exemplary block diagram of a hardware platform that may be a part of a network node or a communication node.

FIG. 6 shows an exemplary block diagram of a hardware platform 600 that may be a part of a network node (e.g., base station on an orbiting satellite) or a terminal (e.g., a UE). A network node can be referred to as a first device and a terminal can be referred to as a second device. The hardware platform 600 includes at least one processor 610 and a memory 605 having instructions stored thereupon. The instructions upon execution by the processor 610 configure the hardware platform 600 to perform the operations described in FIGS. 1 to 5 and/or 7 and in the various embodiments described in this patent document. The transmitter 615 transmits or sends information or data to another node. For example, a network node transmitter can send a message to a user equipment. The receiver 620 receives information or data transmitted or sent by another node. For example, a user equipment can receive a message from a network node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a first device, from a second device, a message comprising one or more fields that include information indicative of a communication delay between the first device and the second device,
   wherein the one or more fields includes a first timing advance amount which is based on a location of the first device and the second device; and
processing the message by:
   determining, by the first device, a second timing advance amount based on a reception of a random-access preamble from the second device; and
   determining, by the first device, a third timing advance amount by combining the first timing advance amount and the second timing advance amount,
   wherein a complete timing advance amount includes the third timing advance amount.

2. The method of claim 1,
wherein the one or more fields includes a time information received by the first device via a second message using a physical uplink shared channel (PUSCH) scheduled by a first message, wherein the first message precedes the second message, and
wherein the first device scrambles control information of the first message using a random-access preamble index and transmits the first message to the second device.

3. The method of claim 1, wherein the one or more fields includes a time information associated with transmission or reception by the second device at a specific time during a random access procedure.

4. The method of claim 1,
wherein the one or more fields includes one or more parameters to determine a time information associated with transmission or reception by the second device at a specific time during a random access procedure, and
wherein the one or more parameters includes index information at the specific time corresponding to any one or more of a radio frame, a subframe, a time slot, and a symbol, and
wherein the time information associated with transmission or reception by the second device is determined by:
   determining, using the one or more parameters, a transmission time information associated with a time when the second device sends a second message using a physical uplink shared channel (PUSCH), or
   determining, using the one or more parameters, a reception time information associated with a time when the second device receives a first message that precedes the second message.

5. The method of claim 1, wherein the one or more fields includes a location information of the second device, and wherein the method further comprises:
   determining, by the first device, a timing advance amount based on the location information of the second device.

6. The method of claim 1, wherein the first device is included in a satellite that orbits earth.

7. A wireless communication method, comprising:
transmitting, by a second device, to a first device, a message comprising one or more fields that include information indicative of a communication delay between the second device and the first device,
   wherein the one or more fields includes a first timing advance amount which is based on a location of the first device and the second device; and
transmitting, by the second device, a random-access preamble to the first device,
   wherein a second timing advance amount is based on a reception of the random-access preamble at the first device,
   wherein a third timing advance amount is a combination of the first timing advance amount and the second timing advance amount, and
   wherein a complete timing advance amount includes the third timing advance amount.

8. The method of claim 7,
wherein the one or more fields includes a time information received by the first device via a second message transmitted by the second device using a physical uplink shared channel (PUSCH) scheduled by a first message, wherein the first message precedes the second message, or
wherein the one or more fields includes a time information transmitted by the second device during a random access procedure, or
wherein the one or more fields includes a time information from a traffic channel bearer after completion of the random access procedure.

9. The method of claim 7, wherein the one or more fields includes a time information associated with transmission or reception by the second device at a specific time during a random access procedure.

10. The method of claim 7,
wherein the one or more fields includes one or more parameters to determine a time information associated with transmission or reception by the second device at a specific time during a random access procedure, and
wherein the one or more parameters includes index information at the specific time corresponding to any one or more of a radio frame, a subframe, a time slot, and a symbol.

11. A first device for wireless communication comprising a processor, configured to implement a method comprising:
receive, from a second device, a message comprising one or more fields that include information indicative of a communication delay between the first device and the second device,
   wherein the one or more fields includes a first timing advance amount which is based on a location of the first device and the second device; and
process the message by the processor configured to:
   determine, by the first device, a second timing advance amount based on a reception of a random-access preamble from the second device; and
   determine, by the first device, a third timing advance amount by combining the first timing advance amount and the second timing advance amount,
   wherein a complete timing advance amount includes the third timing advance amount.

12. The first device of claim 11,
wherein the one or more fields includes a time information received by the first device via a second message using a physical uplink shared channel (PUSCH)

scheduled by a first message, wherein the first message precedes the second message, and wherein the processor of the first device is configured to scramble control information of the first message using a random-access preamble index and transmits the first message to the second device.

13. The first device of claim 11, wherein the one or more fields includes a time information associated with transmission or reception by the second device at a specific time during a random access procedure.

14. The first device of claim 11, wherein the one or more fields includes one or more parameters to determine a time information associated with transmission or reception by the second device at a specific time during a random access procedure, and wherein the one or more parameters includes index information at the specific time corresponding to any one or more of a radio frame, a subframe, a time slot, and a symbol, and wherein the time information associated with transmission or reception by the second device is determined by the processor further configured to:

determine, using the one or more parameters, a transmission time information associated with a time when the second device sends a second message using a physical uplink shared channel (PUSCH), or determine, using the one or more parameters, a reception time information associated with a time when the second device receives a first message that precedes the second message.

15. A second device for wireless communication comprising a processor, configured to implement a method comprising:

transmit, to a first device, a message comprising one or more fields that include information indicative of a communication delay between the second device and the first device, wherein the one or more fields includes a first timing advance amount which is based on a location of the first device and the second device; and transmit a random-access preamble to the first device, wherein a second timing advance amount is based on a reception of the random-access preamble at the first device, wherein a third timing advance amount is a combination of the first timing advance amount and the second timing advance amount, and wherein a complete timing advance amount includes the third timing advance amount.

16. The second device of claim 15, wherein the one or more fields includes a time information received by the first device via a second message configured to be transmitted by the second device using a physical uplink shared channel (PUSCH) scheduled by a first message, wherein the first message precedes the second message, or wherein the one or more fields includes a time information configured to be transmitted by the second device during a random access procedure, or wherein the one or more fields includes a time information from a traffic channel bearer after completion of the random access procedure.

17. The second device of claim 15, wherein the one or more fields includes one or more parameters to determine a time information associated with transmission or reception by the second device at a specific time during a random access procedure, and wherein the one or more parameters includes index information at the specific time corresponding to any one or more of a radio frame, a subframe, a time slot, and a symbol.

18. A system, comprising:

a second device configured to:

transmit to a first device, a message comprising one or more fields that include information indicative of a communication delay between the second device and the first device; and the first device is configured to:

receive the message sent by the second device, wherein the one or more fields includes a first timing advance amount which is based on a location of the first device and the second device; and process the message by the first device configured to:

determine a second timing advance amount based on a reception of a random-access preamble from the second device; and determine a third timing advance amount by combining the first timing advance amount and the second timing advance amount, wherein a complete timing advance amount includes the third timing advance amount.

19. The system of claim 18, wherein the one or more fields includes one or more parameters to determine a time information associated with transmission or reception by the second device at a specific time during a random access procedure, and wherein the one or more parameters includes index information at the specific time corresponding to any one or more of a radio frame, a subframe, a time slot, and a symbol, and wherein the time information associated with transmission or reception by the second device is determined by the first device further configured to:

determine, using the one or more parameters, a transmission time information associated with a time when the second device sends a second message using a physical uplink shared channel (PUSCH), or determine, using the one or more parameters, a reception time information associated with a time when the second device receives a first message that precedes the second message.

20. The system of claim 18, wherein the one or more fields includes one or more parameters to determine a time information associated with transmission or reception by the second device at a specific time during a random access procedure, and wherein the one or more parameters includes index information at the specific time corresponding to any one or more of a radio frame, a subframe, a time slot, and a symbol.

\* \* \* \* \*